United States Patent [19]

Macur et al.

[11] Patent Number: 4,512,900

[45] Date of Patent: Apr. 23, 1985

[54] METHOD FOR TREATING WASTE COMPOSITIONS

[75] Inventors: George J. Macur, Endwell; W. Robert Pratt, Binghamton; James E. Sharkness, Ithaca, all of N.Y.

[73] Assignee: International Business Machines Corporation, Armonk, N.Y.

[21] Appl. No.: 561,030

[22] Filed: Dec. 13, 1983

[51] Int. Cl.³ .............................................. C02F 1/32
[52] U.S. Cl. .................................. 210/748; 210/759; 210/760; 210/904; 210/912
[58] Field of Search ............... 210/748, 759, 760, 904, 210/912

[56] References Cited

U.S. PATENT DOCUMENTS

| | | | |
|---|---|---|---|
| 4,289,594 | 9/1981 | Alpaugh et al. | 204/158 |
| 4,332,687 | 6/1982 | Daignault | 210/759 X |
| 4,417,987 | 11/1983 | Harrison | 210/904 X |

*Primary Examiner*—Thomas Wyse
*Attorney, Agent, or Firm*—Pollock, Vande Sande & Priddy

[57] ABSTRACT

Process for treating liquid waste compositions which contain copper ions and a complexing agent for the copper which includes reducing the concentration of copper ions in the waste composition to less than about 8 ppm and contacting the composition with $H_2O_2$; and then contacting the waste composition with an ozone-containing gas and irradiating with ultraviolet light.

26 Claims, No Drawings

METHOD FOR TREATING WASTE COMPOSITIONS

TECHNICAL FIELD

The present invention is concerned with the treatment of liquid waste compositions which contain copper ions and a complexing agent for the copper in order to destroy the complexing agent. In particular, the present invention is related to a process for treating waste compositions with ultraviolet radiation. The process of the present invention is particularly advantageous when treating liquid waste compositions or overflow from electroless copper plating baths.

BACKGROUND ART

One source of liquid waste compositions which contain copper ions and an organic material which complexes copper is the chemical waste stream or overflow from electroless copper plating baths referred to as copper additive plating. Electroless copper plating baths generally contain cupric ions, a reducing agent, a surfactant, and a complexing agent for cupric ions. In addition, the bath may contain numerous other chemicals, such as, for instance, cyanide ions as disclosed in U.S. Pat. No. 3,844,799 to Underkofler, et al. With respect to electroless copper plating processes, attention is also directed to U.S. Pat. No. 4,152,467 to Alpaugh, et al.

Waste chemical streams from such processes have been processed to remove copper and recover and recycle the complexing agent for the copper in a sequence of steps commonly referred to as "primary recovery". One such "primary recovery" technique includes removing copper from a plating bath overflow composition by plating out copper (i.e., deplating) from solution onto copper cathodes. It is believed that such technique results in the production of undesirable anodic oxidation products of organics present in the composition, such as ethylenedinitrioltetraacetic acid. Such a copper removal process yields a liquid composition with a copper concentration of at least 10-20 ppm as a practical operating lower limit. In addition, in such a process, the iron concentration in solution is increased in view of the reactions occurring at the stainless steel anodes and because of a high concentration of complexing agent in the solution. Besides the copper, the effluent resulting from such a treatment contains a complexing agent for the copper and relatively large amounts of dissolved organic and inorganic salts.

After the copper is removed, the solution is then transferred to another tank where the complexing agent is precipitated by the addition of sulfuric acid to provide a pH of about 2.5 and below. After the complexing agent settles to the bottom of the tank, the solution which is decanted is termed "additive waste".

The complexing agent remaining at the bottom of the tank is washed twice with deionized water and is then recycled to the plating bath. These two wash solutions or decants contain mainly sodium sulfate and formic acid along with dissolved and suspended complexing agent. These wash solutions can be combined with the additive waste solution or held for separate treatment or usage. However, in all cases, significant amounts of suspended complexing agent are transferred into the waste solutions and the particulate complexing agent must be removed by filtration prior to further treatment. As a result, the material is currently unacceptable for direct discharge to existing plant waste treatment systems. Accordingly, as a result, the material is pumped to a storage tank and disposed of by approved methods.

Moreover, even if the additive waste solution contained only sodium sulfate and a few hundred ppm of the complexing agent, it would not be put through the plant waste treatment because the complexing agent would tend to dissolve heavy metals by complexing from the clarifier and piping system and thereby carry these into surrounding natural water sources, such as rivers, where the composition is finally discharged. Although copper would make up the bulk of the complex metal, small amounts of other heavy metals are quite possible.

More recently, Alpaugh, et al. have developed a process, as disclosed in U.S. Pat. No. 4,289,594, whereby the level of the complexing agent is reduced low enough so that the waste composition can be treated subsequently in the usual plant waste treatment systems, including clarifiers, without causing dissolution of heavy metals by complexing from the clarifier and the piping system.

The process disclosed in U.S. Pat. No. 4,289,594 includes contacting the waste solution with an ozone-containing gas in an amount effective to react with and destroy the complexing agent for the copper and irradiating the waste solution with ultraviolet light. Prior to irradiating the solution with ultraviolet light, the concentration of the copper ions in the waste solution is reduced to less than about 8 ppm.

Other suggestions of the use of ozone include U.S. Pat. Nos. 4,332,687 to Daignault, et al. and 3,920,547 to Garrison, et al.

For instance, U.S. Pat. No. 4,332,687 to Daignault, et al. suggests treating a waste solution containing heavy metals complexed with organic compounds by contacting the solution with a mixture of hydrogen peroxide and ozone.

U.S. Pat. No. 3,920,547 to Garrison, et al. suggests a process for destroying cyanides including contacting a cyanide-containing solution with ozone and exposing the solution to ultraviolet radiation.

Also, there have been suggestions such as in U.S. Pat. Nos. 4,012,321 to Koubek and 4,294,703 to Wilms, et al. of using $H_2O_2$ in the treatment of waste compositions.

For example, U.S. Pat. Nos. 4,012,321 to Koubek suggests treating an aqueous waste stream containing organic pollutants with $H_2O_2$ and irradiating with ultraviolet light.

U.S. Pat. No. 4,294,703 to Wilms, et al. suggests reducing the COD-content of effluent by first adding to the effluent 5–40% of the calculated quantity of $H_2O_2$ required for complete oxidation, and then subjecting the effluent to flocculation-absorption. In addition, Wilms, et al. suggest problems in using $H_2O_2$ to remove all COD.

DISCLOSURE OF INVENTION

The present invention is directed to a process for treating waste compositions which contain copper ions and a complexing agent for the copper ions. The process of the present invention provides for the treatment of a waste composition which is less costly to carry out than, but which is just as effective as the above-described treatment with ozone and ultraviolet light. The process of the present invention involves an ozone-ultraviolet light process step, but requires significantly less time for this step; and therefor, is much less costly to carry out.

The process of the present invention includes reducing the concentration of copper ions in said liquid waste compositions to a value less than about 8 ppm and contacting the resulting waste composition with $H_2O_2$ in an amount and in a concentration effective to destroy from about 20 to about 60% of the total organic content of the composition. The composition is then contacted with an ozone-containing gas and irradiating the ozone-containing waste composition with ultraviolet light.

The present invention results in more complete oxidation than can be achieved with $H_2O_2$ alone and more rapid oxidation than can be achieved by using ozone and irradiation in the absence of $H_2O_2$.

The use of $H_2O_2$ and irradiation alone cannot achieve substantially complete destruction of the organic content and requires excessive amounts of $H_2O_2$ when the treatment involves destroying more than about 60% of the organic content. On the other hand, although the use of the ultraviolet radiation and ozone process, disclosed by Alpaugh, et al. in U.S. Pat. No. 4,289,594, can achieve substantially complete destruction of the organic content of the waste, such is relatively expensive and not as fast as the present invention.

BEST AND VARIOUS MODES FOR CARRYING OUT INVENTION

The waste solutions treated according to the present invention initially contain significant quantities of copper ion and complexing agent for the copper. The compositions are aqueous compositions and most advantageously are those obtained as effluent or overflow from copper plating and especially from electroless copper plating.

The preferred copper plating compositions are those described in U.S. Pat. Nos. 3,844,799 and 4,152,467, disclosures of which are incorporated herein by reference. In particular, such electroless copper plating baths preferably contain about 30 to about 50 g/l of complexing agent; about 3 to about 15 g/l of a cupric salt, such as cupric sulfate; about 0.7 to about 7 g/l of a reducing agent such as formaldehyde; about 0.02 to about 0.3 g/l of a surface-active agent such as Gafac RE 610; about 10 to about 25 mg/l of a cyanide such as sodium cyanide; and a basic compound such as sodium hydroxide or potassium hydroxide to provide a pH of about 11.6 to about 11.8.

Examples of complexing agents include Rochelle salts; ethylenedinitrilotetraacetic acid; metal salts of ethylenedinitrilotetraacetic acid such as the alkali metal salts including the sodium (mono-, di-, tri-, and tetrasodium) salts of ethylenedinitrilotetraacetic acid; nitrilotriacetic acid and its metal salts such as the alkali salts; gluconic acid; gluconates; triethanol amine; glucono-(gamma)-lactone; modified ethylene diamine acetates such as N-hydroxyethyl ethylene diamine triacetate.

The preferred complexing agents are ethylenedinitrilotetraacetic acid, nitrilotriacetic acid or 2-hydroxyethylene diamine triacetate or metal salts thereof. The metal salts include the alkali metal salts and especially the sodium salts such as mono-, di-, tri-, and tetrasodium salts of ethylenedinitrilotetraacetic acid. Mixtures of complexing agents can be present.

The most preferred complexing agents employed are ethylenedinitrilotetraacetic acid (i.e., EDTA) and the alkali metal salts thereof.

Typical waste solutions treated according to the present invention contain at least about 20 g/l of complexing agent and at least about 1 g/l of copper ions. Typical waste solutions treated according to the present invention contain the following:

| | |
|---|---|
| cupric ion source (e.g., cupric sulfate pentahydrate) | 3–15 g/l |
| reducing agent (e.g., formaldehyde) | .7–7 g/l |
| surfactant (GAFAC RE 610) | 0.02–0.3 g/l |
| complexing agent (e.g., "EDTA", i.e., ethylenedinitrilotetraacetic acid) | 20–50 g/l |
| pH | 11.6–11.8 |
| specific gravity | 1.060–1.080 |

In addition, the composition can include other components such as cyanide ions from, for example, sodium cyanide such as in amounts of about 10–25 mg/l. Moreover, the waste compositions contain relatively large amounts of iron as ferric complex with the complexing agent; about 100–105 g/l of sodium sulfate; and about 20–30 g/l of the oxidized form of the reducing agent (e.g., formic acid).

It is essential to the practice of the present invention that the copper ion concentration of the waste solution be reduced to less than 8 ppm, preferably less than 5 ppm, and most preferably less than 1 ppm prior to the ozone-ultraviolet light step.

It is critical to the success of the present invention to reduce the concentration of copper ions in the waste solution to less than about 8 ppm prior to the ozone-ultraviolet light treatment step. A preferred method of reducing the copper ion content is to add pure copper dust to a batch of the additive bath overflow waste solution and a reducing agent such as about 7–15 ml/l of a 37% aqueous formaldehyde and adjusting the pH to about 12 by an addition of a basic material such as sodium hydroxide or potassium hydroxide. This treatment results in reducing copper ions in the composition to levels below 1 ppm. It is most convenient to employ a 37% aqueous formaldehyde solution and a 50% sodium hydroxide solution for this purpose. The treatment can be carried out at about 70° to 80° C. The reaction which occurs is set forth below:

\*$CuSO_4 + 2HCHO + 4NaOH \rightarrow Cu° +$ 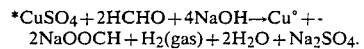
$2NaOOCH + H_2(gas) + 2H_2O + Na_2SO_4$.

\*Cu(II) is present in the solution as EDTA complex.

In addition, the above process also results in conversion of any residual inorganic cyanide in the aqueous composition to to non-toxic organic substances such as the cyanohydrin form and glycolic acid.

Moreover, the problem of producing anodic oxidation products which can occur with the plating-deplating process referred to hereinabove, is not present in the present invention.

This treatment is capable of reducing the copper ion concentration to levels below 1 ppm whereas the deplating technique described hereinabove results in compositions containing dissolved iron ions, as well as at least 10 to 20 ppm of copper ions.

It is also preferred, according to the present invention, to reduce the iron ion concentration to less than 5 ppm and preferably, less than 1 ppm prior to the treatment with the ozone.

After the copper ion concentration is decreased to the desired level, the composition is preferably, but not necessarily, transferred to a precipitation tank where the complexing agent such as the major amount of ethylenedinitrilotetraacetic acid is precipitated by the addition of an acid such as sulfuric acid, as is currently practiced.

The acid is added in amounts sufficient to provide the composition with a pH of about 1.5-3 and preferably about 2.5, or below, for best results.

The somewhat enlarged copper particles can remain on the bottom of the tank as seed for the next batch of plating solution to be processed or can be washed with the deionized water prior to etching.

The composition, after the removal of the complexing agent, still contains significant amounts of the complexing agent. In the case of EDTA, at least about 500 mg/l are present and usually at least about 1000 mg/l. The composition also contains generally from about 20 to about 30 g/l of organic carbon compounds, which is mostly reducing agent and/or oxidized compound therefrom, and at least 100 g/l of inorganic salts such as sodium sulfate.

The aqueous waste composition is also contacted with $H_2O_2$ in an amount and in a concentration sufficient to destroy from about 20 to about 60%, preferably about 40 to about 60%, and most preferably about 50 to about 60% of the total organic content prior to the ozone-ultraviolet light treatment step.

The treatment with $H_2O_2$ can be carried out prior to the reduction of the copper in concentration to less than 8 ppm, but preferably is carried out subsequent to the reduction of the copper ion concentrate to less than 8 ppm. The treatment with $H_2O_2$ can be carried out with copper levels up to about 50 ppm.

In order to determine the amount of $H_2O_2$ to employ, the total organic content of the waste can be measured by any known technique such as with a Dohrman/Envirotech, Model DC-54 Ultraflow Organic Carbon Analyzer and then the amount of $H_2O_2$ needed to destroy the desired portion thereof can be readily calculated. For instance, since the major amount (i.e., about 90-95% by weight) of organic material to be destroyed, in the preferred waste compositions treated pursuant to the present invention is formic acid, it is suitable, for the sake of simplicity, to assume that all of the organic is formic acid and that the amount of $H_2O_2$ can be determined according to the following reaction:

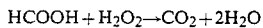
$$HCOOH + H_2O_2 \rightarrow CO_2 + 2H_2O$$

For instance, to destroy 50% of the organic, one could use, for each formula weight of HCOOH present, about ½ of a formula weight of $H_2O_2$.

The $H_2O_2$ is preferably added as an aqueous solution having concentration of about 20 to about 50% and most preferably about 50% by weight.

The $H_2O_2$ should desirably be mixed into the waste composition as effectively as possible in order to maximize the effectiveness of the $H_2O_2$.

Although not necessary, but if desired, the $H_2O_2$ containing composition can be subjected to irradiation with U.V. light. The source of ultraviolet light, when employed, can take any conventional form and is generally a conventional source which emits radiation within the ultraviolet light region of the spectrum. Any typical source of ultraviolet light can be utilized in accordance with the process of the present invention. A typical ultraviolet light source is Volt Arc G36 T66 Ultraviolet Lamp rated at 36 watts.

This stage of the process is preferably carried out at a pH of about 1.5 to 3 and preferably about 2-2.5 and at a temperature of about 150° F. to about 200° F. and preferably about 200° F.

This stage of the process generally takes about 1-2 hours for completion.

This treatment step causes destruction and decomposition of organic compounds present in the waste composition. Using formic acid as a typical example of the oxidized form of the reducing agent, the primary reactor involved is as follows:

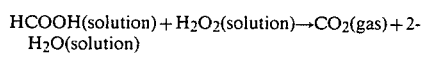
$$HCOOH(\text{solution}) + H_2O_2(\text{solution}) \rightarrow CO_2(\text{gas}) + 2\text{-}H_2O(\text{solution})$$

In the preferred aspects of the present invention, all of the $H_2O_2$ is exhausted in this step. The composition at this stage will still contain undesirable amounts of the complexing agent such as the EDTA which is not converted to $CO_2$ and $H_2O$ with the $H_2O_2$ and ultraviolet light.

The aqueous waste composition is then subjected to an ozone-containing gas and irradiation with ultraviolet light. This treatment causes destruction and decomposition of the organic compounds present in the waste composition. Using formic acid as a typical example of the oxidized form of the reducing agent, the primary reaction involved is as follows:

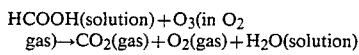
$$HCOOH(\text{solution}) + O_3(\text{in } O_2 \text{ gas}) \rightarrow CO_2(\text{gas}) + O_2(\text{gas}) + H_2O(\text{solution})$$

This stage of the process is preferably carried out at a pH of about 4 to 6. The pH can be adjusted to a value of about 4 to 6 by adding dilute aqueous sodium hydroxide or aqueous $H_2SO_4$ depending upon its pH prior to the ozone treatment. This will depend upon whether the copper ion concentration was reduced to less than 8 ppm prior to or after the $H_2O_2$ treatment. The use of a pH in the above range provides for increased rate of oxidation of the formic acid present. In addition, it is preferred that the iron ion concentration be less than 5 ppm, and preferably less than about 1 ppm during this stage of the reaction, since such level helps to further enhance the destruction of the complexing agent. Moreover, as discussed hereinabove, it is critical to the practice of the present invention that the concentration of the copper ions in solution be less than 8 ppm prior to the ozone-ultraviolet light treatment. It is believed that by reducing the concentration of copper ions in solution, the formation of fine particles of black CuO is significantly reduced.

The primary reaction products from this stage of the process are $CO_2$ and $H_2O$. In addition, the process is capable of providing a product which contains less than about 10 mg/l and preferably less than about 5 mg/l of the complexing agent. This is to ensure that the waste composition can be discharged through the usual plant clarifier system without causing problems with respect to complexing of heavy metals within the clarifying system and piping arrangement.

The amount of ozone employed is dependent upon the amount of organic materials in the composition which are to be decomposed. Generally at least 8 grams of ozone are employed per gram of organic carbon atom present. The mass flow rate of the ozone through the composition is generally up to about 57 mg/minute per quart of solution. The ozone is preferably employed in an amount to react with and destroy substantially all of the organic content. The ozone-containing gas is bubbled through the aqueous composition in order to maximize the contact area between the ozone and the organic material. The ozone-containing gas is preferably a mixture of ozone and oxygen and preferably contains about 3 to about 3.5% by weight of ozone. The temperature during the treatment is generally about 25° C. (normal room temperature) to about 50° C.

If desired, the treatment step with $H_2O_2$ and the step with the ozone can be carried out in the same reaction vessel.

Any conventionally employed ozone-generating device can be employed in accordance with the present invention. One typical ozone-generating device generates a gas which comprises about 1 to about 8% by weight ozone, from about 20 to about 99% by weight oxygen, and up to about 80% by weight nitrogen, with possibly small quantities of other gases which are normally present in air such as carbon dioxide, argon, and the like. The term "ozone-containing gas" is meant to embrace any and all gases which are generated by an ozone generator, and the amount of ozone and other components of the ozone-containing gas can be varied within wide limits while still obtaining the advantages of the process of the present invention. A typical ozone-generator is an Orec Model 03 B2-0 Ozonator made by Ozone Research and Equipment Corporation, Phoenix, Ariz.

In the process disclosed in U.S. Pat. No. 4,289,594 it is preferred, in view of the presence of surface-active agents in the aqueous composition, to initially bubble the ozone-containing gas through the composition at a very low feed rate, such as less than about 0.1 standard cubic feet per minute per 9 liters of waste solution in order to minimize the formation of foam in the composition. Normally, the low flow rate is maintained until foaming due to the presence of the surface-active agent subsides to a point low enough to allow oxygen flow to increase to about 0.5 standard cubic feet per minute per 9 liters of waste solution without foaming over the top of the treatment vessel. The foam destruction, according to the process in U.S. Pat. No. 4,289,594, usually takes about 30 minutes. During this period of time, the surface-active agent, which is generally concentrated in the film of liquid surrounding the gas bubbles, is destroyed by the ozone.

However, according to the present invention, it is not necessary to initially bubble the ozone-containing gas through the composition at a very low feed rate since the $H_2O_2$ treatment affects the surface-active agent so that foam formation does not occur.

The source of ultraviolet light employed according to the present invention can take any conventional form and is generally a conventional source which emits radiation within the ultraviolet region of the spectrum. Any typical source of ultraviolet light can be utilized in accordance with the process of the present invention. A typical ultraviolet light source is Volt Arc G36 T66 Ultraviolet Lamp rated at 36 watts.

It is believed that at the beginning of the treatment with the ultraviolet radiation and ozone, that the reducing agent and/or oxidized form therefrom such as formic acid, still constitutes more than about 90% by weight of the organic components in the aqueous composition, and the oxidation of such consumes most of the ozone fed into the composition by the following reaction:

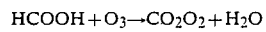

$$HCOOH + O_3 \rightarrow CO_2O_2 + H_2O$$

As a result, only a small portion of the initial ozone feed is available for oxidizing the complexing agent, such as the ethylenedinitrilotetraacetic acid, as well as the other organic components of the waste composition. Of course, as the treatment proceeds, a greater portion of the ozone becomes available for oxidation of the complexing agent.

However, the overall process for oxidizing the complexing agent in the presence of, for instance, formic acid and the various other organic constituents in the composition is relatively slow. For instance, for a composition with the same initial concentration of complexing agent, such as the ethylenedinitrilotetraacetic acid, but not containing other organic compounds, the oxidation treatment would require only two or three hours.

As discussed in U.S. Pat. No. 4,289,594, by reducing the cupric ion concentration to less than 1 ppm, as most preferred, the amount of time needed to reduce the amount of complexing agent to less than 5 mg/l is less than half of the time required when greater amounts of cupric ion are present. In particular, the amount of time needed is from about 8 to about 10 hours following the process disclosed in U.S. Pat. No. 4,289,594.

However, by following the process of the present invention; whereby the waste composition is also subjected to treatment with $H_2O_2$ prior to the ozone-ultraviolet light treatment, the amount of time needed for said ozone treatment can be reduced to about ½ of the time required without the $H_2O_2$ pretreatment for achieving the same results.

The following nonlimiting example is presented to further illustrate the present invention:

EXAMPLE

Adjust pH of a liquid waste composition to about 1.5-3 with $H_2SO_4$ to precipitate EDTA.

Introduce about 25 gallons of the liquid waste composition from an electroless copper plating bath into a stainless steel reaction chamber.

A typical waste composition is as follows:

| | | |
|---|---|---|
| Sodium sulfate | 100–105 | grams/liter (g/l) |
| EDTA (complexing agent) | 1000 | ppm |
| $Cu^{++}$ (EDTA complex) | 10 | ppm |
| $Fe^{+++}$ (EDTA complex) | 10–20 | ppm |
| pH | 1.8–2 | |
| Total organic content (TOC) | 6500 ± | milligrams/liter (mg/l) |
| GAFAC RE 610 (anionic surfactant) | 50–100 | milligrams/liter (mg/l) |

More than 90% of the organic carbon comes from the formic acid. GAFAC RE 610 is phosphated polyoxyethylenated alkyl phenols and metal salts thereof.

Heat waste composition to about 90° C. and add about 2500 ml of 30% $H_2O_2$ aqueous solution per 25 gallons of waste composition per hour by means of a 2-liter separatory funnel. Mix $H_2O_2$ into waste by passing gaseous $O_2$ through diffusers in the bottom of the reaction chamber. Continue $H_2O_2$ treatment for about 2 hours. The following table illustrates typical results from the treatment.

TABLE

| | TOC (mg/l) | pH |
|---|---|---|
| Waste at Start | 6000 | 1.85 |
| After 1 hour (2500 ml/25 gallons of waste with 30% $H_2O_2$) | 4050 | 2.02 |
| After 2 hours (2nd 2500 ml/25 gallons of waste with 30% $H_2O_2$) Cool $H_2O_2$ treated waste. | 3000 | 1.85 |

Reduce copper ion concentration and iron ion concentration in waste to 1 ppm each by adding about 15 g/12 l batch of pure copper dust, about 90 ml of 37% aqueous formaldehyde and sodium hydroxide to provide a pH of about 12 and heating to about 70° C.

Adjust pH to 4-6 by addition of $H_2SO_4$.

Run tests with an Ultrox. Irrad. Model B-803 bench scale UV-Ozone system. Equip the reaction vessel with 3 volt arc (G36 T66) ultraviolet lamps rated at 36 watts each. Place the lamps which are about 3 feet long inside the vessel in the solution. The lamps are within quartz holders for protection.

Bubble oxygen into the reaction vessel from the bottom through 6 porous polymeric fluorocarbon diffusers or spargers. Turn on both the ultraviolet light lamps and ozone generator. As the ozone generator use an Orec Model 03 B2-0 Ozonator made by Ozone Research and Equipment Corporation of Phoenix, Ariz. Feed oxygen from a cryogenic storage container to the ozonator. Provide an ozone concentration in the oxygen of about 3 to about 3.5 weight percent. Use a gas flow rate of about 0.48 to about 0.5 standard cubic feet per minute. Provide an ozone mass flow rate during the treatment from about 630 to about 690 milligrams per minute. Get the ozone generator power to yield about 2 to about 2.2 pounds per day of ozone.

As the process proceeds, take samples about hourly in order to determine total organic carbon (TOC) analyses and pH measurements. Maintain the pH in the range of about 4 to 6.

Total organic carbon analyses can be carried out with a Dohrman/Envirotech, Model DC-54 Ultralow Organic Carbon Analyzer. Use purified deionized water to make required dilution of waste samples prior to analysis. The measurement and control of solution pH can be carried out with the aid of a Corning Model 12 research type pH meter checked against appropriate buffers for the pH range in question.

Continue treatment with ozone and ultraviolet light for about 3 to 4 hours until total organic carbon in the solution is reduced to a negligible value of below 100 mg/l.

What is claimed is:

1. A process for treating liquid waste composition containing copper ions and an organic complexing agent for the copper ions which comprises:
   reducing the concentration of copper ions in said liquid waste composition to a value less than about 8 ppm;
   contacting the waste composition with $H_2O_2$ in an amount and in a concentration effective to destroy from about 20 to about 60% by weight of total organic content; and
   then contacting the resulting partially-treated waste composition with an ozone-containing gas in an amount effective to react with and destroy complexing agent and organic materials and irradiating the ozone-containing waste composition with ultraviolet light.

2. The process of claim 1 wherein the waste composition is contacted with $H_2O_2$ in an amount and in a concentration effective to destroy from about 40 to about 60% by weight of the total organic content.

3. The process of claim 1 wherein the waste composition is contacted with $H_2O_2$ in an amount and in a concentration effective to destroy from about 50 to about 60% by weight of the total organic content.

4. The process of claim 1 wherein the copper ion concentration is reduced to less than about 5 ppm.

5. The process of claim 1 wherein the copper ion concentration is reduced to less than 1 ppm.

6. The process of claim 1 wherein the concentration of iron ions in the waste composition is reduced to less than 5 ppm prior to the contacting with the ozone-containing gas and irradiation.

7. The process of claim 1 wherein the concentration of iron ions in said waste composition is reduced to less than 1 ppm prior to the contacting with the ozone-containing gas and irradiation.

8. The process of claim 1 wherein the $H_2O_2$-containing composition is irradiated with ultraviolet light.

9. The process of claim 1 wherein the concentration of copper ions is reduced to less than about 8 ppm prior to contact of the waste composition with $H_2O_2$.

10. The process of claim 1 wherein the contacting with $H_2O_2$ is conducted at at temperature of about 150° to about 200° F.

11. The process of claim 1 wherein the contacting with $H_2O_2$ is carried out at a temperature of about 200° F.

12. The process of claim 1 wherein the pH of the waste composition is about 1.5 to about 3 during the contacting with the $H_2O_2$.

13. The process of claim 1 wherein the contacting with the ozone-containing gas and irradiation is carried out at a temperature of about 25° C. to about 50° C.

14. The process of claim 1 wherein the pH of the waste composition is about 4 to about 6 during the treatment with the ozone and irradiation.

15. The process of claim 1 wherein at least 1 gram/liter of copper ion is initially present in the waste composition.

16. The process of claim 1 wherein at least about 500 mg/l of complexing agent is present prior to the irradiation.

17. The process of claim 1 wherein the product obtained contains less than about 10 mg/l of complexing agent.

18. The process of claim 1 wherein the product obtained contains less than about 5 mg/l of complexing agent.

19. The process of claim 1 wherein the complexing agent is selected from the group of ethylenedinitrilotetraacetic acid, nitrilotriacetic acid, hydroxyl derivatives thereof, alkali metal salts thereof, or mixtures thereof.

20. The process of claim 1 wherein the complexing agent is ethylenedinitrolotetraacetic acid, ethylenedinitrilotetraacetic acid or alkali metal salt thereof, or mixtures thereof.

21. The process of claim 1 wherein the maximum concentration of copper ions is about 50 ppm when the waste composition is contacted with $H_2O_2$.

22. The process of claim 1 wherein said organic content includes reducing agent for copper, or oxidized compound therefrom, or both.

23. The process of claim 1 wherein at least 90% of said organic content is reducing agent for copper, or oxidized compound therefrom, or both.

24. The process of claim 23 wherein said organic content includes formic acid.

25. The process of claim 1 wherein said organic content includes formic acid.

26. The process of claim 1 wherein said liquid waste composition contains about 20-30 g/l of the oxidized form of the reducing agent and about 100-105 g/l of sodium sulfate.

* * * * *